United States Patent [19]

Goldman

[11] Patent Number: 4,686,527

[45] Date of Patent: * Aug. 11, 1987

[54] VERIFICATION SYSTEM FOR DOCUMENT SUBSTANCE AND CONTENT

[75] Inventor: Robert N. Goldman, Honolulu, Hi.

[73] Assignee: Light Signatures, Inc., Los Angeles, Calif.

[*] Notice: The portion of the term of this patent subsequent to Feb. 4, 2003 has been disclaimed.

[21] Appl. No.: 797,302

[22] Filed: Nov. 12, 1985

Related U.S. Application Data

[63] Continuation-in-part of Ser. No. 687,708, Dec. 31, 1984, Pat. No. 4,568,936, which is a continuation-in-part of Ser. No. 657,849, Oct. 4, 1984, Pat. No. 4,656,473, which is a continuation-in-part of Ser. No. 503,392, Jun. 10, 1983, Pat. No. 4,476,468, which is a continuation-in-part of Ser. No. 276,282, Jun. 22, 1981, Pat. No. 4,423,415, which is a continuation-in-part of Ser. No. 161,838, Jun. 23, 1980, abandoned.

[51] Int. Cl.$^4$ .......................... H04Q 9/00; G06K 5/00
[52] U.S. Cl. ............................... 340/825.34; 235/380
[58] Field of Search .................. 340/825.34, 825.33; 235/380, 382, 487

[56] References Cited

U.S. PATENT DOCUMENTS

| | | | |
|---|---|---|---|
| 4,450,348 | 5/1984 | Stockburger et al. | 235/380 |
| 4,469,937 | 9/1984 | Stockburger et al. | 340/825.34 |
| 4,476,468 | 10/1984 | Goldman | 340/825.34 |
| 4,489,318 | 12/1984 | Goldman | 340/825.34 |
| 4,546,242 | 10/1985 | Stockburger et al. | 340/825.34 |
| 4,546,352 | 10/1985 | Goldman | 340/825.34 |
| 4,568,936 | 2/1986 | Goldman | 340/825.34 |

Primary Examiner—Donald J. Yusko
Attorney, Agent, or Firm—Nilsson, Robbins, Dalgarn, Berliner, Carson & Wurst

[57] ABSTRACT

An authenticator device, e.g. certificate, of verifiable composition substance and informational content with a system of production and verification. Character uniqueness signals identifying the composition of the device are recorded on the card by printing and magnetics in an encrypted form combined with statistical data signals representative of information on the card. Testing the card involves freshly sensing the character uniqueness data and entering the statistical data. Such fresh data is then compared with the recorded values after decoding. Favorable comparisons manifest approval and enter the statistical data for processing.

19 Claims, 4 Drawing Figures

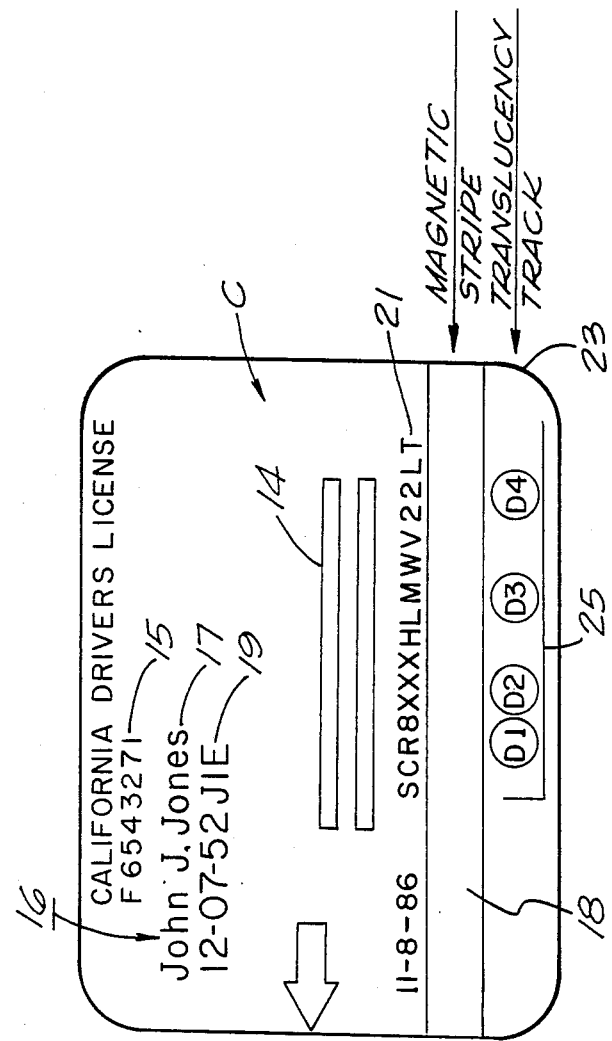

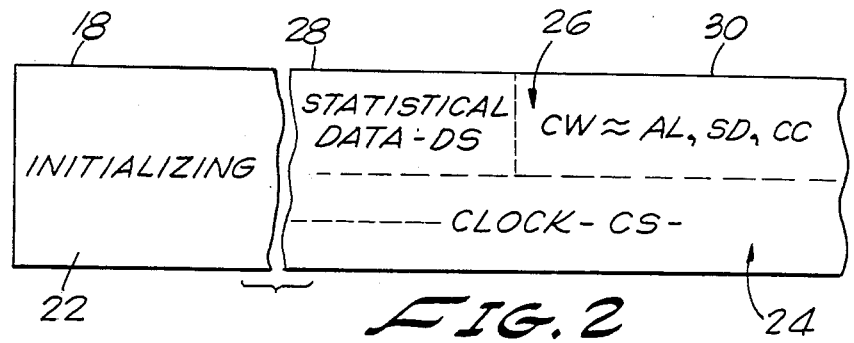
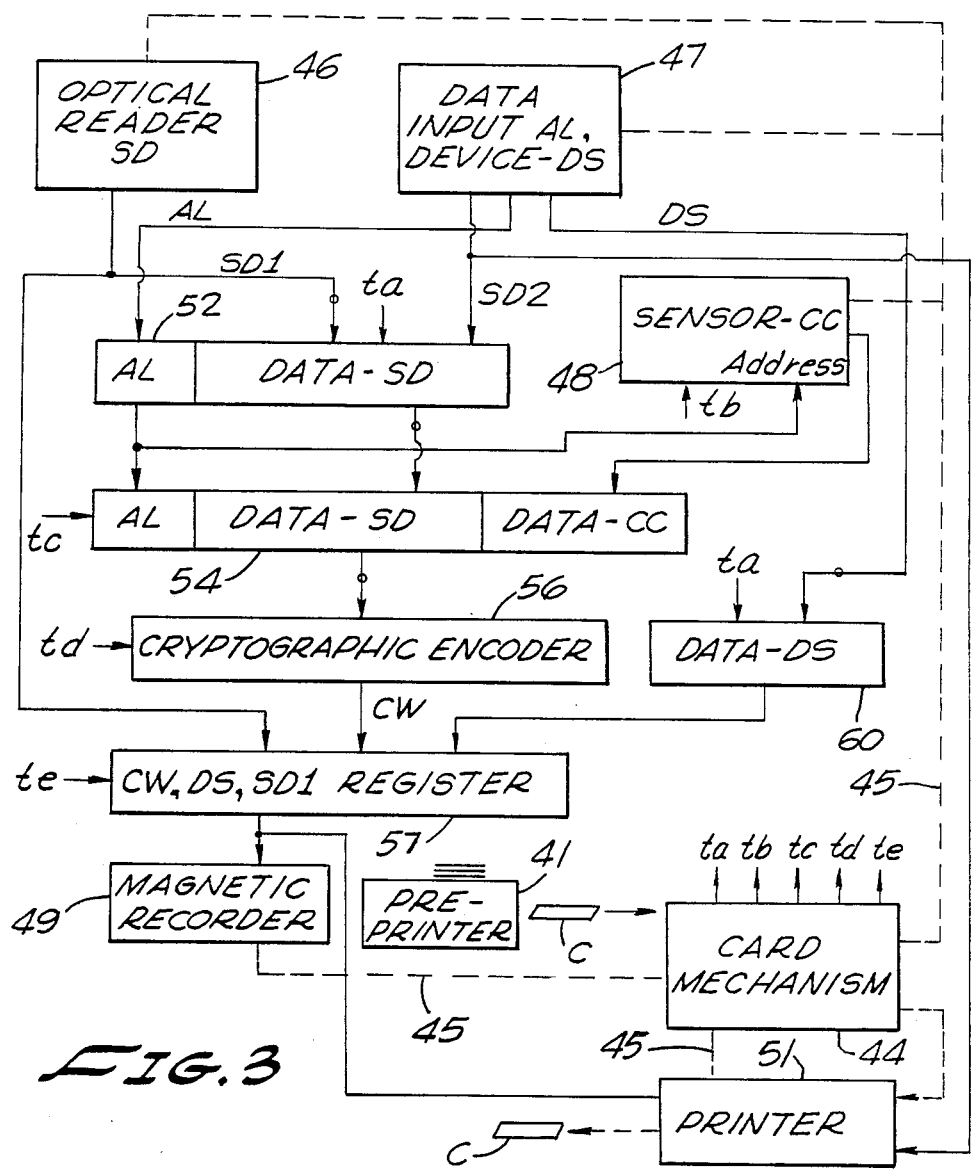

VERIFICATION SYSTEM FOR DOCUMENT SUBSTANCE AND CONTENT

RELATED SUBJECT MATTER

This is a continuation-in-part of U.S. patent application Ser. No. 687,708, filed 12/31/84, now U.S. Pat. No. 4,568,936, which is a continuation-in-part of U.S. patent application Ser. No. 657,849, filed 10/4/84, now U.S. Pat. No.4,656,473, which is a continuation-in- part of U.S. Ser No. 503,392, filed 6/10/83, now U.S. Pat. No. 4,476,468 which is a contination-in-part of U.S. Ser. No. 276,282, filed 6/22/81, now U.S. Pat. No. 4,423,415, which is a continuation-in-part of U.S. application Ser. No. 161,838, filed 6/23/80, now abandoned.

BACKGROUND AND SUMMARY OF THE INVENTION

A growing need exists for practical systems to prepare and process documents. One problem involves authenticating such documents as genuine in a wide variety of different forms. Another problem involves the detection of documents that are genuine but have been modified with regard to certain data. Still another problem involves recording data on a document as for confirmation or data capture. Accordingly, a need exists for an improved, economical, and effective document system for affording solutions to the various problems.

Many forms of documents are used to represent status or fact and accordingly to provide data of financial, commercial, or legal significance. For example, stock certificates and other forms of financial paper constitute a record of ownership but also carry considerable critical data regarding that ownership. A stock certificate might designate a specific individual as the owner of a certain number of shares in a specific company and relate such data to a specific certificate number. Of course, such information is critically important when the certificate is used to support any of a variety of transactions. In that regard, as suggested above, before transactions are based on a document, it should be authenticated as: (1) genuine and (2) bearing unmodified information. Thereafter, data on the document can be reliably captured for processing.

In general, there is considerable manual involvement in processing various documents. Accordingly, a need exists for an improved, effective and economical system whereby documents can be sensed for data to be processed (as by machine reading) and confirmed as being authentic both with regard to the basic material substance of the document and the informational content.

In general, the system of the present invention involves a specific document form, a process, and structures for producing and testing documents that are capable of individual verification both with respect to composition genuineness and informational content. In accordance with the disclosed embodiment, the document takes the form of a sheet of medium, e.g. paper, having a unique (substantially unduplicable) anticounterfeit characteristic which may be machine sensed. The document carries statistical data relating to the essential elements of the document, e.g. financial, legal, and so on.

The document also carries a record of an integral combination of the uniqueness data and the statistical data. In accordance with the disclosed embodiment, the combination data may be encrypted for subsequent decoding to enable comparisons of both uniqueness data and statistical data to verify the document and its content as genuine. The combination data may be recorded for optical perception (e.g. printed), magnetically, or both optically and magnetically.

The present invention embraces processors for the documents including structure for sensing anticounterfeit characteristic data along with certain statistical data, combining and recording the results as by magnetic recording or printing the document.

In accordance with the invention, an illustrative system tests the document by sensing combined data, decoding such data and performing comparisons with freshly sensed uniqueness and statistical data. Depending on the results of the comparison, the system may manifest the document as authentic with regard to substance and content.

As disclosed in detail below, the system hereof may be variously implemented using different media, document compositions, and techniques. For example, a variety of mediums might be employed having substantially unique characteristics for verification. Also, any of a variety of specific component structures may be employed in the system for producing and authenticating documents in accordance herewith.

BRIEF DESCRIPTION OF THE DRAWINGS

In the drawings, which constitute a part of this specification, exemplary embodiments of the invention are set forth as follows:

FIG. 1 is a plan view of an identification card document constructed for use with and implemented in accordance with the present invention;

FIG. 2 is a fragmentary diagrammatic view of an exemplary recording format on the card of FIG. 1;

FIG. 3 is a block diagram of a document production system in accordance with the present invention.

DESCRIPTION OF ILLUSTRATIVE EMBODIMENT

Figure 4:
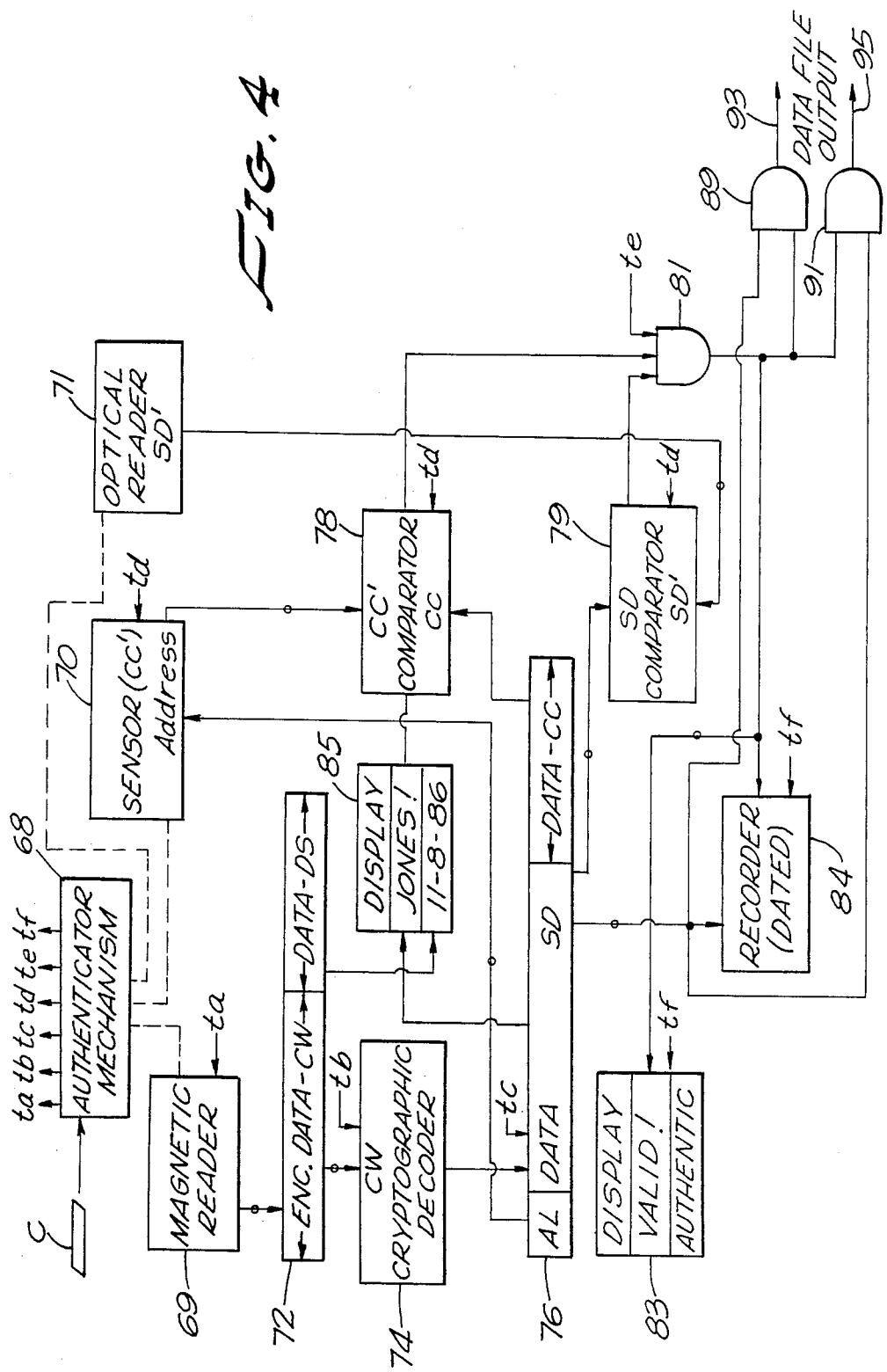
FIG. 4 is a block diagram of a document authentication system in accordance with the present invention.

As indicated above, a detailed illustrative embodiment of the present invention is disclosed herein. However, document media, data formats, and operating systems structured in accordance with the present invention may be embodied in a wide variety of forms, some of which may be quite different from those of the disclosed embodiment. Consequently, the specific structural and functional details disclosed herein are merely representative; yet in that regard they are deemed to afford the best embodiment for purposes of disclosure and to provide a basis for the claims herein which define the scope of the present invention.

Referring initially to FIG. 1, an illustrative document is represented in the form of a driver's license card C for a specific individual. The card C is a basic sheet of bond paper. The format of the card C accommodates personal identification for authorization. Of course, aspects as disclosed herein may be readily adopted for use in a wide variety of documents as indicated above including passports, valuable paper, financial cards, and so on.

The illustrative form of card C is captioned as a "California Driver's License" and includes a general legend 14. Also, the license card C carries individual print 16 (upper left) indicating a license number 15, the name of the assigned holder 17, and his birth date and code 19. Also, a line 21 of print on the card C is individual.

The genuineness of the card C is manifest by an individual anticounterfeit characteristic of the card. Specifically, in the disclosed embodiment the card C is unique by reason of the opacity pattern of the paper sheet comprising the card. Such an individual uniqueness characteristic may be utilized to provide signals for registration and comparison with similar data from subsequent observations. Exemplary detailed formats and structures for such sensing and comparison of a uniqueness characteristic are disclosed in U.S. Pat. No. 4,423,415, NON-COUNTERFEITABLE DOCUMENT SYSTEM. In relation to the present invention, it is important to appreciate that the card C embodies a substantially unique, machine-readable, anticounterfeit characteristic.

In addition to the general and individual print on the card C, it also carries data recorded on a magnetic stripe 18 which coincides to data including that printed at a line 21 extending parallel to the stripe 18. The magnetic stripe 18 and printed line 21 record: statistical data and encrypted composite data for verifying the authenticity of the card C both with regard to substance and content. The magnetic stripe also records clock pulses.

The data of the magnetic stripe 18 and the printed line 21 generally include characteristic uniqueness data (to distinguish a genuine card C from a counterfeit) along with statistical data. The two data forms are combined to provide composite data which is encrypted and recorded on the card C on both the magnetic stripe 18 and line 21. That encrypted data is subsequently sensed, decoded, and separately compared with freshly sensed, similar data to manifest: (1) that the card C is the genuine article and (2) that the critical statistical data on the card has not been modified. That verification establishes the credibility of the critical data to a level where it may be used for reliable direct input to a machine processor.

Pursuing an exemplary format of a card C as a driver's license, that document is often used for ancillary identification. For example, a driver's license often is used to confirm that a person has attained maturity, and accordingly, may legally enter into various transactions. In that regard, the print 16 states the assigned holder's name, "John J. Jones", his birthdate, "12-07-52", and an additional element of arbitrary statistical data, "JIE". In accordance herewith, the critical data comprising the birthdate in the form of printed intelligence is verified. For convenient reference, the indicia on the card C is summarized below with indications of the source and the representative signals as treated in relation to the apparatus of other figures.

| Indicia Chart | | |
|---|---|---|
| Indicia | Source | Signal |
| "California Driver's License" | Preprinted | |
| "F6543271" (License Number) | Preprinted | SD1 |
| "John J. Jones" (Name) | Individually printed | SD2 |
| "12-07-52 JIE" (Birthdate + Code) | Individually printed | SD2 |
| "11-8-86" (License Date) | Individually printed | DS |
| "SCR8XXXHLMWV22LT" | Individually printed | CW |

To verify the birthdate of a card holder, such data is involved with the uniqueness characteristic of the card C. In that regard, in a line 23 containing data, locations D1, D2, D3, and D4 serve as an anticounterfeit characteristic (FIG. 1). The form locations are used for illustrative purposes only. In practice a much larger number of locations, on the order of one hundred, is used. The area is designated generally by a printed index 25. The test locations D1, D2, D3, and D4 are observed in that the translucency of the card is machine sensed to provide a unique anticounterfeit characteristic. A second aspect of the test involves statistical data being merged with uniqueness data then encrypted to a complex form and recorded on the card. Such data then is tested with freshly sensed data after being decoded and segregated.

In view of the above preliminary explanation of functional aspects of the card, consider now its physical composition. The paper sheet 15 in the card C has a reliably repeatable, machine-readable characteristic, e.g. variation in opacity. To observe an example of such a uniqueness characteristic it is simply necessary to hold a sheet of bond paper before a light source and notice the considerable variation in the opacity pattern. That characteristic has been recognized as an effective basis for anticounterfeit uniqueness data as disclosed in detail in the above-referenced U.S. Pat. No. 4,423,415. It may be effectively machine sensed in the form of electrical signals.

The card also carries the magnetic stripe 18 as indicated above. The prior art is replete with techniques and apparatus for providing such a structure for recording available electrical signals. The paper sheet 15 also carries the magnetic stripe 18 as shown.

With regard to electrical signals, at this juncture, identification of specific data elements and the similarly identified representative signals will be helpful. Accordingly, the following designations are used herein:

| | | |
|---|---|---|
| CS | | Clock pulses for timing operations recorded on the stripe 18 |
| CW | | Encrypted data recorded on the magnetic stripe 18 and decodable to provide the following: |
| | AL | Location of character uniqueness data, designating locations D1, D2, D3, and D4 (FIG. 1) |
| | CC | Uniqueness character data, sensed from locations D1, D2, D3, and D4 (FIG. 1) |
| | SD . . . includes: | |
| | SD1 | Statistical data, e.g. driver's license number |
| | SD2 | Statistical data, e.g. name, birthdate, code |
| CC' | | Freshly sensed uniqueness character data sensed from locations D1, D2, D3, and D4 |
| SD' | | Freshly sensed critical statistical data (SD1 and SD2) |
| DS | | Statistical data, e.g. date of license |
| ta-tf | | Timing signals defining specific operating states |

Referring now to FIG. 2, a fragment of the magnetic stripe 18 is represented. The first section 22 (left) of the magnetic stripe 18 carries data to initialize the sensing operation by a magnetic stripe reader. Such formats and the techniques associated with them are well known in the art. Accordingly, an initializing section 22 occupies the leading edge of the stripe 18 (left as illustrated).

Following the initializing section 22, the lower portion of the stripe 18 records clock pulses CS in a track 24 while the upper portion records data in a track 26. The use of recorded clock pulses to synchronize and control data flow is well known in the art.

An initial portion 28 of the data track 26 carries miscellaneous statistical data DS. The magnetically recorded statistical data DS may be the license date as indicated above.

Following the portion 28 of the magnetic stripe 18, a portion 30 records encrypted data CW which is derived from and is reconstructable to manifest component data including: address data AL (specifying locations D1, D2, D3, and D4), counterfeit characteristic data CC, and statistical data SD (SD1 and SD2).

Commenting on the data signals, the uniqueness characteristic data CC actually manifests the signal levels (scale of ten) sensed at the locations D1, D2, D3, and D4 indicated on the card C. The critical statistical data SD1 represents the license number "F6543271". The data SD2 represents the name, "John J. Jones", the birthdate "12-07-52" of the assigned card holder and his code, "JIE". The data CC and SD (SD1 and SD2) are designated by prime marks, e.g. CC' and SD' when it will be compared at a later time when sensed independently with data from the magnetic stripe 18 or the printed line 21.

Preliminarily, consider an exemplary use of the card C by a holder presenting the card to establish that he has attained his maturity. The magnetic stripe 18 and/or the line 21 would be sensed to provide encrypted signals CW. The signals CW would then be de-encrypted to provide the address signals AL, the uniqueness characteristic signals CC, and the critical statistical data SD (SD1 and SD2). The address signals AL designate the locations D1, D2, D3, and D4 which would be sensed to provide freshly sensed signals CC'. Either a magnetic reader or an optical reader would sense the recorded data SD' (representing the name, birthdate, and so on). Test comparisons would then be performed for the signals CC with CC' and SD with SD'. Alternatively, signals CC' may be displayed for a manual comparison.

Favorable comparisons of the data sets indicate that: (1) the substance composition of the document is genuine and (2) the critical statistical data has not been modified. Such positive results would also verify the card to the extent that the statistical data from the card can be accepted with reasonable certainty and used directly for machine processing.

In view of the above introductory explanations of the card C and its use, systems will now be considered for producing the card C and authenticating it. In that regard, reference initially will be made to FIG. 3 for an explanation of a structural system for completing the cards C in accordance with FIG. 1.

Sheets of paper are cut to the configurations of the card C. Either before or after the cutting, the individual cards are printed, "California Driver's License" and "F6543271". The numbers essentially are assigned in sequence to individual cards. Of course, other arrangements are practical; however, numbering the blanks affords a basis for controls. Note that the anticounterfeit characteristic, since it is in the nature of the material, is in the blanks at that time.

In accordance herewith, such raw cards would be as physically represented in FIG. 1 bearing the above designations, however, without the other individual print or the magnetic stripe recorded.

Preliminarily, it is helpful to recognize that signals from different sources are provided for recording magnetically and printing. The driver's license number is sensed from the card as data SD1. An independent input, e.g. terminal, provides the address data AL, the name, birth date and code (SD2). The terminal also supplies the date of the license, e.g. data DS. The translucency of the card C is sensed at locations D1, D2, D3, and D4 to provide the data CC.

A card C (FIG. 3, lower right) is symbolically represented to be moving from a printer 41 to a card mechanism 44. The pre-printer 41 performs the printing explained above, e.g. license number. The licenses might be inventoried in a numbered sequence, or printed with numbers just before processing. In either event, the raw cards are received by the mechanism 44. In general, various transport units are well known in the prior art which include control elements and have the capability of transporting, sensing and otherwise manipulating a document as the card C. In the mechanism 44, the card is positionally supported for a multitude of sensing, printing and recording operations. Details of such a mechanism are disclosed in the U.S. Pat. No. 4,423,415 referenced above.

The card mechanism 44 also provides timing signals t, and directly involves other components as indicated by dashed lines 45. Specifically, the card mechanism 44 is integral with an optical reader 46, a terminal or data input device 47, a uniqueness characteristic sensor 48, a magnetic recorder 49 and a printer 51. These units sense and further record the card C as it is passed through the mechanism 44.

The optical reader 46 senses the statistical data SD1, e.g. the driver's license number F6543271, from the card. The input device 47 provides the address signals AL along with the data SD2 and DS. The sensor 48 provides the uniqueness characteristic signal CC. The development, processing and effects of these signals will now be considered in detail.

The address signals AL from the device 47 are set in a register 52 along with the data signals SD (SD1 from the reader 46 and SD2 from the device 47). Such operations occur during a timing interval ta.

From the register 52, the address signals AL are provided to the uniqueness characteristic sensor 48 which senses the card C at the locations D1, D2, D3, and D4 (FIG. 1) providing uniqueness characteristic signals CC in a digital format. The characteristic sensing operation is performed by the sensor 48 during the interval of timing signal tb with the resulting signals CC provided to a compiling register 54 during the timing signal tc as illustrated in FIG. 3. During the same interval tc, the address signal AL and the data signals SD are also received in the compiling register 54.

The data assembled in the register 54 (signals AL, SD, and CC) is supplied to a cryptographic encoder 56 where it is merged and encoded using any of a variety of encryption techniques to provide decodable, representative signals CW. In that regard, a variety of cryptographic encoders are well known in the prior art and may be employed in embodiments of the present invention. Thus, the cryptographic encoder 56 operates during the interval of the timing signal td and supplies the signals CW representative of the data AL, SD, and CC combined in a decodable format.

From the encoder 56, the representative signals CW are supplied to a register 57 which also receives the data signals DS (date of license). Note that the signals DS are provided to a register 60 (FIG. 3, center right) from the input device 47 during the timing interval ta. Accordingly, such signals are ready for movement to the register 57 during signal te along with the signals CW.

During the interval of timing signal te, the contents of the register 57 is supplied to the printer 51 and the magnetic recorder 49 for recording the data onto the card both as printing and as a record in the magnetic stripe 18. The printer 51 also receives the data SD2 from the device 47. Accordingly, recording is performed both magnetically and by printing. Specifically, the printer 51 prints the data SD2 ("John J. Jones", "12-07-52 JIE"), the data DS ("11-8-86") and the coded data representation CW ("SCR8XXXHLMWV22LT"). The same data plus SD1 (license number) is recorded on the magnetic stripe 18 by the recorder 49. Accordingly, the card C (FIG. 1) is completed with the magnetic stripe 18 recorded in the format of FIG. 2. The card C may now be delivered to an assigned holder, i.e. one "John J. Jones", born "12-07-52" as depicted on the card C.

In use, the card C may be variously authenticated. For example, the line 21 or the stripe 18 can be sensed and decoded. After sensing the anticounterfeit characteristic at locations D1, D2, D3, and D4, the signal CC' is developed. If the value of CC' accords to the value of CC, then the decoded data SD can be manifest for visual comparison with the printing on the card. Thus, authentication involves decoding the integrated encrypted data to provide separate component information for individual comparisons. As indicated above, after decoding and separation, the anticounterfeit or uniqueness information (data CC) is employed in a test to determine that the card is genuine. The statistical information (data SD) also may be employed in a machine test to verify that such information on the card has not been altered. A system for performing the authentication is illustrated in FIG. 4 and will now be considered.

To sense and validate a card C (upper left), it is placed in an authenticator holder or mechanism 68 which is associated with a magnetic reader 69, a sensor 70, and an optical reader 71 (dashed lines 67).

The mechanism 68 includes means for providing the timing signals ta–tf. In cooperation with the mechanism 68, a magnetic reader 69 transduces the magnetic stripe 18 (FIGS. 1 and 4) to provide signals representative of the data CW and SD. Alternatively, an optical code reader may sense the same data from the line 21. Of course, redundant sensing may also be performed. However, in accordance herewith, the reader 69 performs the sensing. The signals sensed by the magnetic reader 69 are provided to a register 72 during a timing interval indicated by a timing signal ta.

Signal representations from the register 72 comprising the encrypted data CW are applied to a cryptographic decoder 74 which functions during an interval of timing signal tb to develop the signal representations AL, SD, and CC which signals are placed in a register 76 during the interval of a timing signal tc. Note that the decrypted data actually consists of the address data AL, the statistical data SD, and the uniqueness character data CC.

Recapitulating, the contents of the magnetic stripe 18 (FIGS. 1 and 4) is sensed by the magnetic reader 69 to provide two separate data packages in the register 72, i.e. encrypted data CW and data DS. The encrypted data CW is supplied to the cryptographic decoder 74 which operates to load the register 76 with the separated and decoded data. The data DS from the register 72 remains in that location for use as will be explained below.

The address data AL from the register 76 is applied to the sensor 70 (upper right) for controlling that apparatus to observe the card C for uniqueness data at the locations D1, D2, D3, and D4 (FIG. 1). Accordingly, fresh anticounterfeiting, uniqueness character data CC' is sensed during signal td. Signals representative of the fresh uniqueness data CC' are applied to a comparator 78. The comparator 78 tests the freshly sensed uniqueness signals CC' with the previously recorded uniqueness signals CC (decoded from the encryption). The test serves to indicate the card C as genuine.

The optical reader 71 senses the printed data SD' providing representative signals to a comparator 79. Accordingly, in an action supplementary to confirming the genuiness of the card, the statistical data signals are compared in the comparator 79 to verify the card content. Specifically, the optical reader 71 provides freshly sensed statistical data SD' for comparison during signal td with the originally sensed statistical data DS from register 76, e.g. the birthdate "12-07-52".

The comparators 78 (document genuine) and 79 (document content authentic) provide approval output signals to an AND gate 81 which is also qualified by a timing signal te. On qualification, the occurrence of a high signal from the AND gate 81 indicates that the card is genuine and has not been altered with respect to certain data. That output is applied to a display unit 83 and to a recorder 84 incorporating data processing capability. The display unit 83 indicates the validity of the card C. The recorder 84 records the fact that the card was tested and approved on a particular date. Essentially, the recorder 84 may include any of a variety of forms of bulk storage, e.g. magnetic tape, along with a control system for recording entries. Specifically in the disclosed embodiment, the recorder 84 operates during a timing interval tf to record the critical data SD on approval and in a format indicating the date of the approval. Additionally, data from the register 72 may be recorded to identify the card C, the bearer of the card, or both.

To enhance an appreciation of the system of the present invention, consider an exemplary operation involving specific use. Assume the existence of a card as illustrated in FIG. 1 assigned to one "John J. Jones" and further assume that the assigned bearer has presented the card to identify himself as a person who has attained his maturity, i.e has reached the age of consent. Under the circumstances, assume that the card C is placed in the authenticator mechanism 68 (FIG. 4) for testing.

From the magnetic stripe 18, the system provides data signals DS to activate the unit 85 with the display of the license date. Of course, any or all of the data SD can be displayed. Independently, the magnetic stripe data specifies the statistical data, "John J. Jones".

For comparison, the uniqueness data and the statistical data are freshly sensed by the sensor 70 and the reader 71. Thus, the decoded original statistical data SD is compared with the freshly sensed statistical data SD'. In a proper situation, a match verifies the card content. In such a situation, the comparator 79 partly qualifies the AND gate 81.

The test for card substance authenticity involves the uniqueness signals CC (from the magnetic stripe) and CC' (freshly sensed). Those signals are applied to the comparator 78. In operation, the comparator 78 may be as set forth in the above-referenced U.S. Pat. No. 4,423,415. An adequate degree of comparison produces the high level of a binary signal to further qualify the AND gate 81. As a consequence, at timing interval te the gate 81 is qualified to activate the display unit 83 and the recorder 84. On activation, the display unit 83 manifests that the card is genuine and unaltered with respect to the critical statistical data. Accordingly, the user of the system simply observes the display 85 to confirm the assigned card holder's name and the display unit 83 to observe that the card is authentic. A reliable test is thus performed to verify the holder's age and his qualification to enter into a transaction requiring majority. To confirm the event of the test and the approval, the recorder 84 carries the statistical data if some question should develop at a future date. The recorder also may associate with other data processing apparatus that acts on the critical statistical data with the assurance that it has been verified. As illustrated, the system may be associated with processing apparatus incorporating a data file. Accordingly, the register 76 is coupled to an output line 93 through the AND gate 89. Similarly, the register 72 supplies statistical data through an AND gate 91 to an output line 95. The gates 89 and 91 are controlled by the approval signal from the gate 81 indicating that the card tests genuine and not altered. It may therefore be seen that upon testing an authentic document, data from the document is captured for direct entry into a data file.

From the above descriptions, it may be appreciated that a system is disclosed for reliably verifying the genuine substance of a document and its content, e.g. that the document has not been altered with regard to critical data. Various forms of the system may well be adapted to process a wide variety of different documents. For example, the system may be adapted for use with financial paper which may be sensed by machine and if tested as genuine the resulting data may be processed with a good degree of reliability. Of course, various other forms of the system may be implemented and used as will be apparent from the above description. Accordingly, the scope hereof is deemed as set forth in the claims below.

What is claimed is:

1. An apparatus for producing secure, individually distinct, machine-processable documents, comprising:
    a document mechanism means for positionally supporting said documents;
    anticounterfeit character sensing means for sensing anticounterfeit characteristic data from a document as positioned by said document mechanism means;
    means for receiving individual statistical data for said documents;
    means for encoding said anticounterfeit data and said statistical data; and
    means for recording said anticounterfeit data and said statistical data on a document in encoded form as said document is positioned by said document mechanism means.

2. An apparatus according to claim 1 wherein said means for recording comprises a printer means.

3. An apparatus according to claim 1 wherein said means for recording comprises a magnetic recorder.

4. An apparatus according to claim 1 further including means to sense a document to provide said statistical data.

5. An apparatus according to claim 4 wherein said means to sense comprises an optical reader.

6. An apparatus according to claim 1 wherein said means for encoding comprises means for cryptographically encoding.

7. An apparatus according to claim 1 wherein said means for recording comprises a printer means and further including means to sense a document to provide said statistical data.

8. apparatus according to claim 1 wherein said means for recording comprises a printer means and a magnetic recorder.

9. A process for producing distinct secure data bearing individual documents, comprising the steps of:
    selecting document blanks with an individual anticounterfeit characteristic;
    sensing said selected document blanks to provide anticounterfeit data signals representative of said individual anticounterfeit characteristics;
    providing other data signals representative of other data for said document;
    recording certain of said anticounterfeit data and said other data on said document blank in a machine-readable form; and
    recording certain of said other data on said document blank in a human-readable form.

10. A process according to claim 9 further including an initial step of: prerecording at least some of said other data on said document blank wherein said step of providing other data signals includes sensing said prerecording.

11. A process according to claim 9 wherein said step of recording certain of said data in human-readable form comprises printing on said document.

12. A process according to claim 9 wherein said anticounterfeit characteristic comprises translucency.

13. A process according to claim 9 wherein said document blanks comprise paper.

14. A process according to claim 9 wherein said step of recording certain of said anticounterfeit data and certain of said other data includes magnetic recording.

15. A process according to claim 9 wherein said step of recording certain of said anticounterfeit data and certain of said other data includes printing.

16. A process according to claim 9 wherein said step of recording certain of said anticounterfeit data and certain of said other data includes a step of cryptographic encoding.

17. A system for producing an authenticator device from a sheet or the like having a physical anticounterfeit characteristic, said system comprising:
    means for sensing said physical anticounterfeit characteristic from said sheet to provide sensed anticounterfeit signals representative of said anticounterfeit characteristic;
    means for providing signals representative of critical statistical data for said authenticator; and
    means for recording certain of said sensed anticounterfeit signals in combination with certain of said signals representative of statistical data on said sheet in machine-readable form and in humanly perceivable form said means for recording including a printer.

18. A system according to claim 17 wherein said means for recording includes a magnetic recorder means.

19. A system according to claim 17 wherein said combination is encoded.

* * * * *